United States Patent
Yasuma

(10) Patent No.: US 8,646,066 B2
(45) Date of Patent: Feb. 4, 2014

(54) SECURITY PROTOCOL CONTROL APPARATUS AND SECURITY PROTOCOL CONTROL METHOD

(75) Inventor: Kensuke Yasuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1631 days.

(21) Appl. No.: 11/871,718

(22) Filed: Oct. 12, 2007

(65) Prior Publication Data

US 2008/0092206 A1    Apr. 17, 2008

(30) Foreign Application Priority Data

Oct. 16, 2006    (JP) ................................. 2006-281885

(51) Int. Cl.
*H04L 29/06*    (2006.01)

(52) U.S. Cl.
USPC ........ 726/14; 726/1; 726/7; 726/15; 713/153; 709/225; 370/351

(58) Field of Classification Search
USPC .......................................................... 726/14
See application file for complete search history.

(56) References Cited

U.S. PATENT DOCUMENTS

| | | | |
|---|---|---|---|
| 7,222,234 B2* | 5/2007 | Martin et al. | 713/171 |
| 2005/0066197 A1* | 3/2005 | Hirata et al. | 713/201 |
| 2006/0005008 A1* | 1/2006 | Kao | 713/153 |
| 2006/0230446 A1* | 10/2006 | Vu | 726/15 |

FOREIGN PATENT DOCUMENTS

| | | |
|---|---|---|
| JP | 2003-179592 A | 6/2003 |
| JP | 2004-199414 A | 7/2004 |
| JP | 2004-48458 A | 9/2005 |

OTHER PUBLICATIONS

Zheng, Liangbin, and Yongbin Zhang. "An Enhanced IPSec Security Strategy." International Forum on Information Technology and Applications (2009).*

S. Deering, R. Hinden, Internet Protocol, Version 6, Specification, Dec. 1998, pp. 1-39.

Funk, Paul, et al., "TLS Inner Application Extension (TLS/IA)", Internet-Draft memo, Jun. 25, 2006, 83 pages (including Jun. 12, 2012 JP Office Action cover sheet from JP application 2006-281885), Publisher: Internet Engineering Task Force (IETF), Fremont, California, http://www7b.biglobe.ne.jp/~k-west/SSLandTLS/draft-funk-tls-inner-application-extension-03.txt.

* cited by examiner

*Primary Examiner* — Taghi Arani
*Assistant Examiner* — Narciso Victoria
(74) *Attorney, Agent, or Firm* — Canon USA, Inc., IP Division

(57) ABSTRACT

A security protocol control apparatus includes a communication unit configured to perform a communication with a communication partner via a network, and a setting information generation unit configured to, based on setting information for a first security protocol previously established, generate, within the security protocol control apparatus, setting information for a second security protocol that has not yet been established.

20 Claims, 5 Drawing Sheets

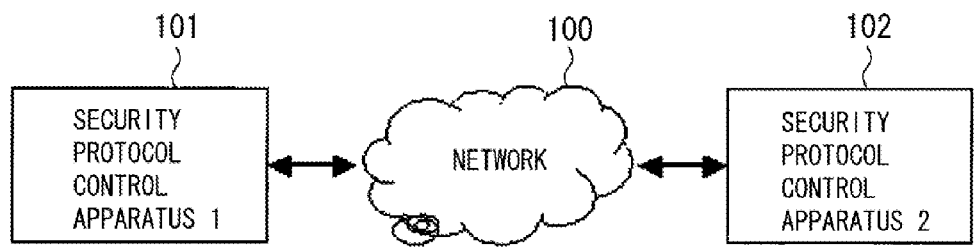
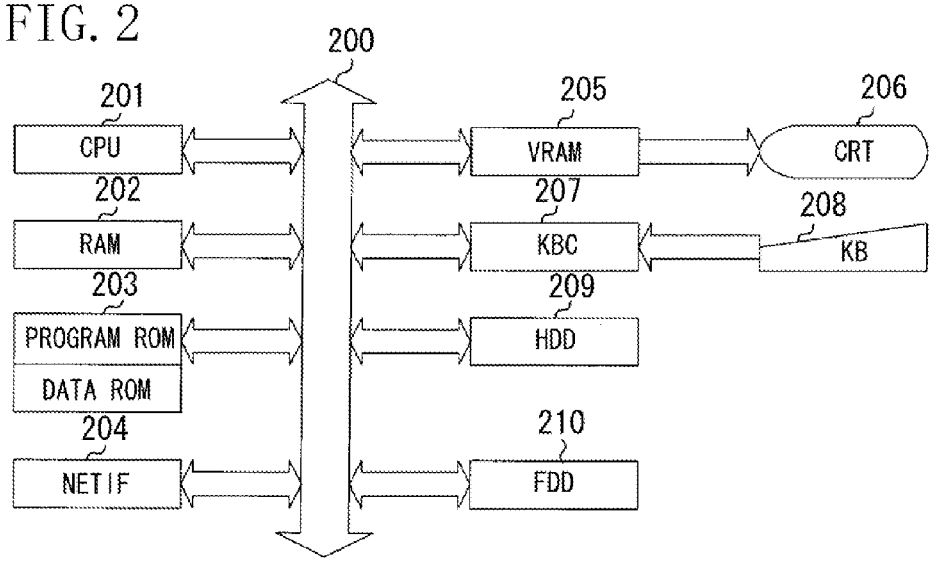
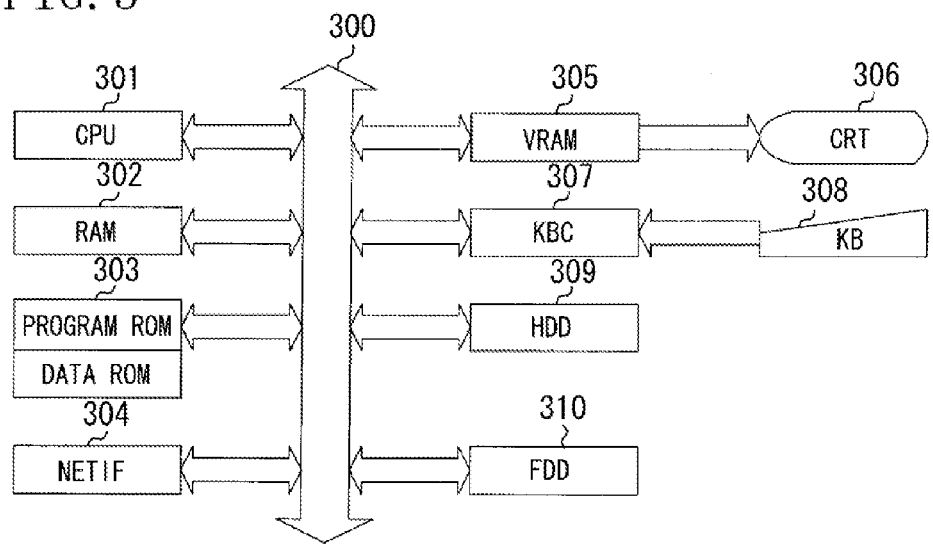

SECURITY PROTOCOL CONTROL APPARATUS 1

SECURITY PROTOCOL CONTROL APPARATUS 2

SECURITY PROTOCOL CONTROL APPARATUS AND SECURITY PROTOCOL CONTROL METHOD

BACKGROUND OF THE INVENTION

1. Field of the Invention

The present invention relates to a communication encryption processing apparatus configured to perform encryption processing and authentication processing.

2. Description of the Related Art

In recent years, data security has been considered more significant than ever in the field of Internet engineering. A seven-layer model for Open System Interconnection (OSI) (OSI reference model), which includes a physical layer, a data link layer, a network layer, a transport layer, a session layer, a presentation layer, and an application layer, has been utilized in the Internet engineering. A security protocol for each of the layers in the seven-layer model for OSI has been proposed.

Hereinbelow, security protocols for the network layer and the session layer will be described. First, a description will be made as to the security protocol for the network layer. A communication standard that implements a communication according to Internet Protocol Version 6 (IPv6) is standardized as Request for Comments (RFC) 2460. IPv6 requires implementation of an IP Security Protocol (IPsec).

The IPsec uses a common key to authenticate and encrypt data. Accordingly, it is necessary to previously share an encryption key between apparatuses. In addition, in utilizing the IPsec, it is necessary to set an IP address as a parameter.

As described above, in the case of utilizing the IPsec, it is necessary to set various parameters. Thus, it is not easy for a user to set parameters for the IPsec because setting parameters for the IPsec requires a technical knowledge.

In this regard, an Internet Key Exchange (IKE) protocol can be used for negotiating and managing a common key between apparatuses. However, a very complicated user operation is required to use the IKE. In addition, it is not easy to apply the IKE to a small built-in device.

Now, the security protocol for the session layer will be described.

Most web browsers generally utilize Secure Sockets Layer (SSL) in performing a communication that requires a sufficient security with a web server. The SSL does not depend on IP. Accordingly, the SSL is useful for a communication that requires a sufficient level of security between a mobile terminal apparatus or a plurality of apparatuses and a server.

A user operation required to use the SSL is not so much complicated, compared to the user operation required to use the IKE. Accordingly, it is relatively easy to apply the SSL to a small built-in device.

Various methods for controlling a security protocol that requires a complicated user operation have been proposed so far. Japanese Patent Application Laid-Open No. 2003-179592 discusses a method for controlling a security protocol by utilizing a key exchange server that exchanges a key for various security protocols.

Japanese Patent Application Laid-Open No. 2004-48458 discusses a method for applying the IPsec by exchanging a key for the IKE after performing an authentication according to the SSL.

However, the method discussed in Japanese Patent Application Laid-Open No. 2003-179592 requires a key exchange server for exchanging a key for a security protocol. Accordingly, with this method, various troubles, such as managing and operating the key exchange server, may become a burden on a user. In addition, the method discussed in Japanese Patent Application Laid-Open No. 2003-179592 requires an authentication of the key exchange server and a sufficient security on a communication path to the key exchange server. Accordingly, the cost of manufacture may become high.

Furthermore, the method discussed in Japanese Patent Application Laid-Open No. 2004-48458 requires the application of the IKE, which is not easy to apply to a small built-in apparatus. In addition, the method discussed in Japanese Patent Application Laid-Open No. 2004-48458 requires a policy server that manages a policy. Accordingly, with this method, various troubles, such as managing and operating the key exchange server, may become a burden on a user.

The cost for installing and operating a server and a restriction with respect to the network topology may become a major problem in utilizing a security protocol. In addition, it is difficult to apply a security protocol that requires a complicated user operation for setting the security protocol to start a communication to a small built-in device that has only a small amount of resources.

SUMMARY OF THE INVENTION

The present invention is directed to a security protocol control apparatus that does not require a user to manage or operate a server and that is capable of reducing a burden on a user for performing a security protocol setting operation performed to start a data communication, such as an authentication operation and an operation for generating parameters for the security protocol such as an encryption key.

According to an aspect of the present invention, a security protocol control apparatus includes a communication unit configured to communicate with a communication partner, and a setting information generation unit configured to, based on setting information for a first security protocol previously established, generate, within the security protocol control apparatus, setting information for a second security protocol that has not yet been established.

According to another aspect of the present invention, a security protocol control apparatus includes a setting information generation unit configured to, based on a plurality of setting information for a first security protocol previously established, generate, within the security protocol control apparatus, setting information for a second security protocol that has not yet been established in a layer different from a layer of the first security protocol, and a communication unit configured to communicate with a communication partner according to the second security protocol.

According to yet another aspect of the present invention, a method includes communicating with a communication partner, and, based on setting information for a first security protocol previously established, generating, within the security protocol control apparatus, setting information for a second security protocol that has not yet been established.

According to yet another aspect of the present invention, a method includes, based on a plurality of setting information for a first security protocol previously established, generating, within the security protocol control apparatus, setting information for a second security protocol that has not yet been established in a layer different from a layer of the first security protocol, and communicating with a communication partner via a network according to the second security protocol.

According to an exemplary embodiment of the present invention, it is not necessary for a user to perform a series of complicated operations for starting processing for performing setting for a communication according to an IPsec by previously generating setting information for the IPsec for which a security association (SA) has not yet been established, based on setting information for an SSL session that has been already established. In addition, according to an exemplary embodiment of the present invention, setting information for the IPsec can be generated even in a case where a communication according to the SSL has not yet been established. Accordingly, it is not necessary to perform complicated processing for generating setting information for the IPsec or to provide and operate a separate server apparatus.

According to an exemplary embodiment of the present invention, if sufficient information for the setting information for the IPsec cannot be acquired from the SSL session information, the setting information for the IPsec can be complemented based on information entered by a user and information generated based on biometric information about the user. Accordingly, the processing for generating setting information for the IPsec can be simplified.

According to an exemplary embodiment of the present invention, based on a plurality of setting information for a first security protocol that has already been established, setting information for a second security protocol that has not yet been established in a layer different from a layer of the first security protocol can be generated. Accordingly, it is not necessary for a user to perform complicated processing required for setting information for the security protocol.

According to an exemplary embodiment of the present invention, even in a case where the first security protocol has not been established, setting information for the second security protocol can be generated. Accordingly, it is not necessary for a user to perform complicated processing for generating setting information for the second security protocol or to provide and operate a separate server apparatus.

According to an exemplary embodiment of the present invention, if information sufficient as setting information for a second security protocol cannot be acquired based on setting information for a first security protocol, the setting information for the second security protocol can be complemented with information entered by a user and information generated based on information about biometric information about the user. Accordingly, the processing for generating the setting information for the second security protocol can be simplified.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 1 illustrates an example of a network configuration according to an exemplary embodiment of the present invention.

FIG. 2 illustrates an example of a hardware configuration of a security protocol control apparatus according to an exemplary embodiment of the present invention.

FIG. 3 illustrates an example of a hardware configuration of a security protocol control apparatus according to an exemplary embodiment of the present invention.

DETAILED DESCRIPTION OF THE EMBODIMENTS

Figure 4:
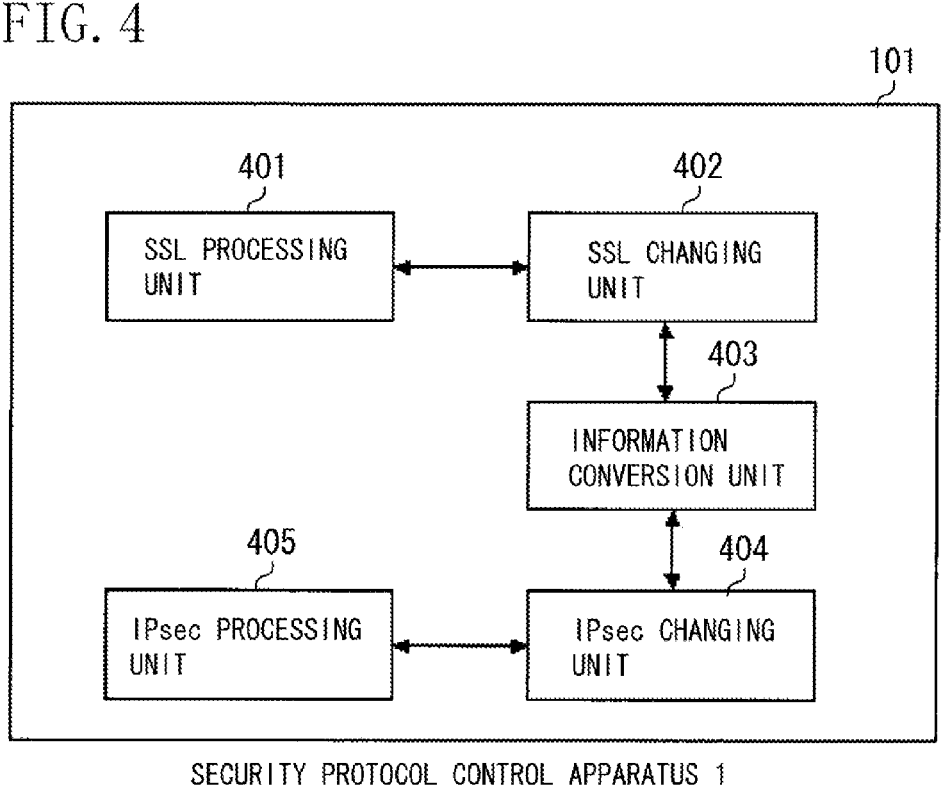
FIG. 4 illustrates an example of a configuration of inner modules of a security protocol control apparatus according to an exemplary embodiment of the present invention.

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

A first exemplary embodiment of the present invention is described below. FIG. 1 illustrates an example of a network configuration according to the first exemplary embodiment of the present invention.

Referring to FIG. 1, a network 100 can be the Internet. A security protocol control apparatus 1 101 and a security protocol control apparatus 2 102 can communicate with each other utilizing a communication protocol for a network layer, such as IPv4 communication protocol or IPv6 communication protocol, via the network 100.

The security protocol control apparatus 1 101 can perform an encrypted communication, in which the content of the communication is encrypted, and a data communication in which the data integrity is secured, with the security protocol control apparatus 2 102 according to a security protocol, such as IPsec, SSL, or Transport Layer Security (TLS).

The security protocol control apparatus 2 102 can perform an encrypted communication, in which the content of the communication is encrypted, and a data communication in which the data integrity is secured, with the security protocol control apparatus 1 101 according to a security protocol, such as IPsec, SSL, or TLS.

The configuration of both the security protocol control apparatus 1 101 and the security protocol control apparatus 2 102 can differ according to the security protocol. In the case of using the IPsec, the security protocol control apparatus 1 101 and the security protocol control apparatus 2 102 have the same configuration. On the other hand, in the case of using the SSL, one of the security protocol control apparatus 1 101 and the security protocol control apparatus 2 102 serves as a server apparatus and the other serves as a client apparatus.

In the example illustrated in FIG. 1, one security protocol control apparatus 1 101 and one security protocol control apparatus 2 102 are connected to the network 100. However, the present embodiment is not limited to this configuration. That is, a plurality of security protocol control apparatuses 1 101 and a plurality of security protocol control apparatuses 2 102 can be connected to the network 100.

FIG. 2 illustrates an example of a hardware configuration of the security protocol control apparatus 1 101 according to the present embodiment. A security protocol control apparatus can be configured not only with a computer system, such as a personal computer (PC), but also any terminals having a communication function to communicate with another security protocol control apparatus, including a workstation, a notebook computer, a palm top computer, a computer-incorporated television set or household electrical product, a game machine having a communication function, a mobile-phone, a Personal Handyphone System (PHS), and a combination of some of them.

Referring to FIG. 2, a central processing unit (CPU) 201 controls the system of the security protocol control apparatus 1 101. A random access memory (RAM) 202 serves as a main memory for the CPU 201. Furthermore, the RAM 202 serves as a work area for the CPU 201. That is, the RAM 202 temporarily stores a program executed by the CPU 201 and temporarily stores data.

A read-only memory (ROM) 203 is a boot ROM that stores a system boot program executed by the CPU 201.

The ROM 203 includes a program ROM that stores an operating system (OS), which is a system program for controlling devices and units in the computer system, and a data ROM that stores information necessary for operating the system. A hard disk drive (HDD) 209 can be used instead of the ROM 203.

A network interface (hereinafter referred to as the "NETIF") 204 performs control for transmitting data between computer systems via the network 100 and performs a diagnosis operation as to a network connection status.

A video RAM (hereinafter referred to as the "VRAM") 205 is used for rasterizing an image to be displayed on a screen of a cathode ray tube (CRT) 206, which displays an operation status of the computer system, and controls the display on the screen.

A keyboard controller (KBC) 207 controls a signal input via a keyboard (KB) 208. The keyboard 208 receives an operation on the computer system performed by a user of the computer system. The present invention is not limited to a keyboard, and any other type of external input device, such as a mouse, that would enable practice of the present invention is applicable.

While the present embodiment refers to an HDD 209, any other type of storage device that would enable practice of the present invention is applicable.

In the present embodiment, the application program is a software program for operating various security protocol control units.

An external input/output device inputs and outputs data and application program to and from a removable storage medium such as a floppy disk or a compact disc-read only memory (CD-ROM). The external input/output device will be hereinafter referred to as the FDD 210.

The application program or the data to be stored on the HDD 209 can be stored on the FDD 210.

The above-described units and devices are in communication with one another via an input/output bus (address bus, data bus, and control bus) 200.

FIG. 3 illustrates an example of a hardware configuration of the security protocol control apparatus 2 102 according to the present embodiment.

The security protocol control apparatus 2 102 has a similar hardware configuration as that of the security protocol control apparatus 1 101 illustrated in FIG. 2. That is, the security protocol control apparatus 2 102 includes, as illustrated in FIG. 3, a CPU 301, a RAM 302, a ROM (program ROM and data ROM) 303, a NETIF 304, a VRAM 305, a CRT 306, a KBC 307, a KB 308, an HDD 309, and an FDD 310, which are in communication with one another via an input/output bus 300, and each of which has a configuration similar to the components 201 through 210 of the security protocol control apparatus 1 101. Accordingly, a description thereof will not be repeated here.

FIG. 4 illustrates an example of a configuration of inner modules of the security protocol control apparatus 1 101 according to the present embodiment.

Referring to FIG. 4, an SSL processing unit 401 performs processing, such as authentication processing and encryption processing, utilizing SSL.

An SSL changing unit 402 refers to, extracts, and inserts various parameters required to the SSL. The SSL changing unit 402 further refers to security information for the SSL and manages a state of the SSL. The security information for the SSL includes authentication information and encryption key information in the SSL and parameters required to utilize the SSL.

An information conversion unit 403 acquires various parameters for the SSL and the status information about the SSL from the SSL changing unit 402. In addition, the information conversion unit 403 acquires various parameters for the IPsec and the status information about the IPsec from an IPsec changing unit 404.

Furthermore, the information conversion unit 403 converts the acquired information into abstracted information or into protocol-dependent information, such as various parameters for the SSL or the IPsec.

In addition, the information conversion unit 403 inserts the various parameters for the SSL and the SSL status information into the SSL changing unit 402. Furthermore, the information conversion unit 403 inserts the various parameters for the IPsec and the IPsec status information into the IPsec changing unit 404.

The IPsec changing unit 404 refers to, extracts, and inserts various parameters required to utilize the IPsec. The IPsec changing unit 404 further refers to security information for the IPsec and manages a state of the IPsec. The security information for the IPsec includes authentication information and encryption key information in the IPsec and parameters required to utilize the IPsec.

An IPsec processing unit 405 performs authentication processing and encryption processing utilizing the IPsec.

Figure 5:
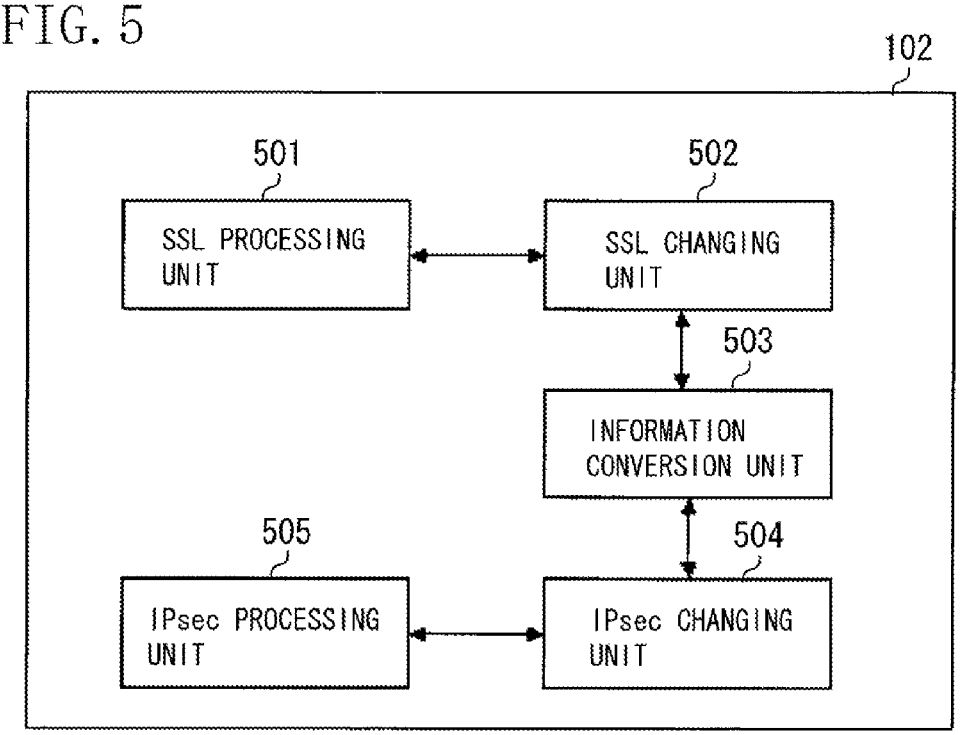
FIG. 5 illustrates an example of inner modules of a security protocol control apparatus according to an exemplary embodiment of the present invention.

FIG. 5 illustrates an example of inner modules of the security protocol control apparatus 2 102 according to the present embodiment.

The security protocol control apparatus 2 102 has inner modules similar to those of the security protocol control apparatus 1 101 illustrated in FIG. 4. That is, the security protocol control apparatus 2 102 includes an SSL processing unit 501, an SSL changing unit 502, an information conversion unit 503, an IPsec changing unit 504, and an IPsec processing unit 505, each of which has a configuration similar to the components 401 through 405 of the security protocol control apparatus 1 101 illustrated in FIG. 4. Accordingly, a description thereof will not be repeated here.

Figure 6:
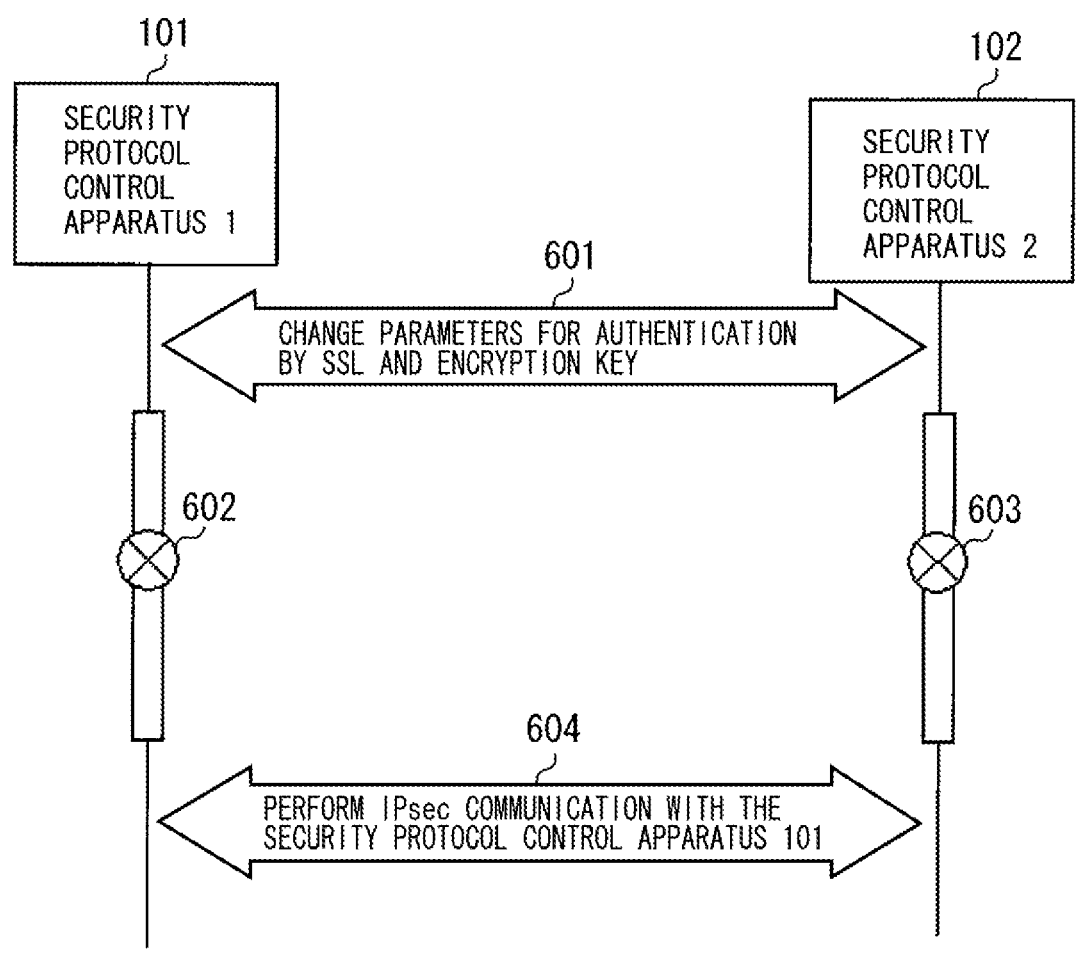
FIG. 6 is a timing chart illustrating an entire sequence according to an exemplary embodiment of the present invention.

FIG. 6 is a timing chart illustrating the entire sequence according to the present embodiment. Hereinbelow, a basic processing performed according to the present exemplary embodiment will be described with reference to FIG. 6. Then, a configuration characteristic to the present embodiment will be described.

First, the user connects the security protocol control apparatus 1 101 and the security protocol control apparatus 2 102 to the network 100. Then, the security protocol control apparatus 1 101 starts a communication with the security protocol control apparatus 2 102 according to the SSL.

Processing 601 is performed according to the SSL. In the processing 601, parameters for authentication processing according to the SSL and the encryption key are generated.

In processing 602, the security protocol control apparatus 1 101 starts a communication with the security protocol control apparatus 2 102 according to the IPsec.

Here, the security protocol control apparatus 1 101 dynamically converts information about the parameters for the authentication processing according to the SSL and the encryption key generated in the processing 601 into a security association (SA) for the IPsec. Then, the converted and generated SA for the IPsec is applied to the security protocol control apparatus 1 101.

Similarly, in processing 603, the security protocol control apparatus 2 102 converts information about the parameters for the authentication processing according to the SSL and the encryption key generated in the processing 601 into a security association (SA) for the IPsec. Then, the converted and generated SA for the IPsec is applied to the security protocol control apparatus 2 102.

After having performed the processing 602, the security protocol control apparatus 1 101 holds the SA for the IPsec. Thus, the security protocol control apparatus 1 101 can perform a communication with the security protocol control apparatus 2 102 according to the IPsec.

After having performed the processing 603, the security protocol control apparatus 2 102 holds the SA for the IPsec. Thus, the security protocol control apparatus 2 102 can perform a communication with the security protocol control apparatus 1 101 according to the IPsec (processing 604).

Figure 7:
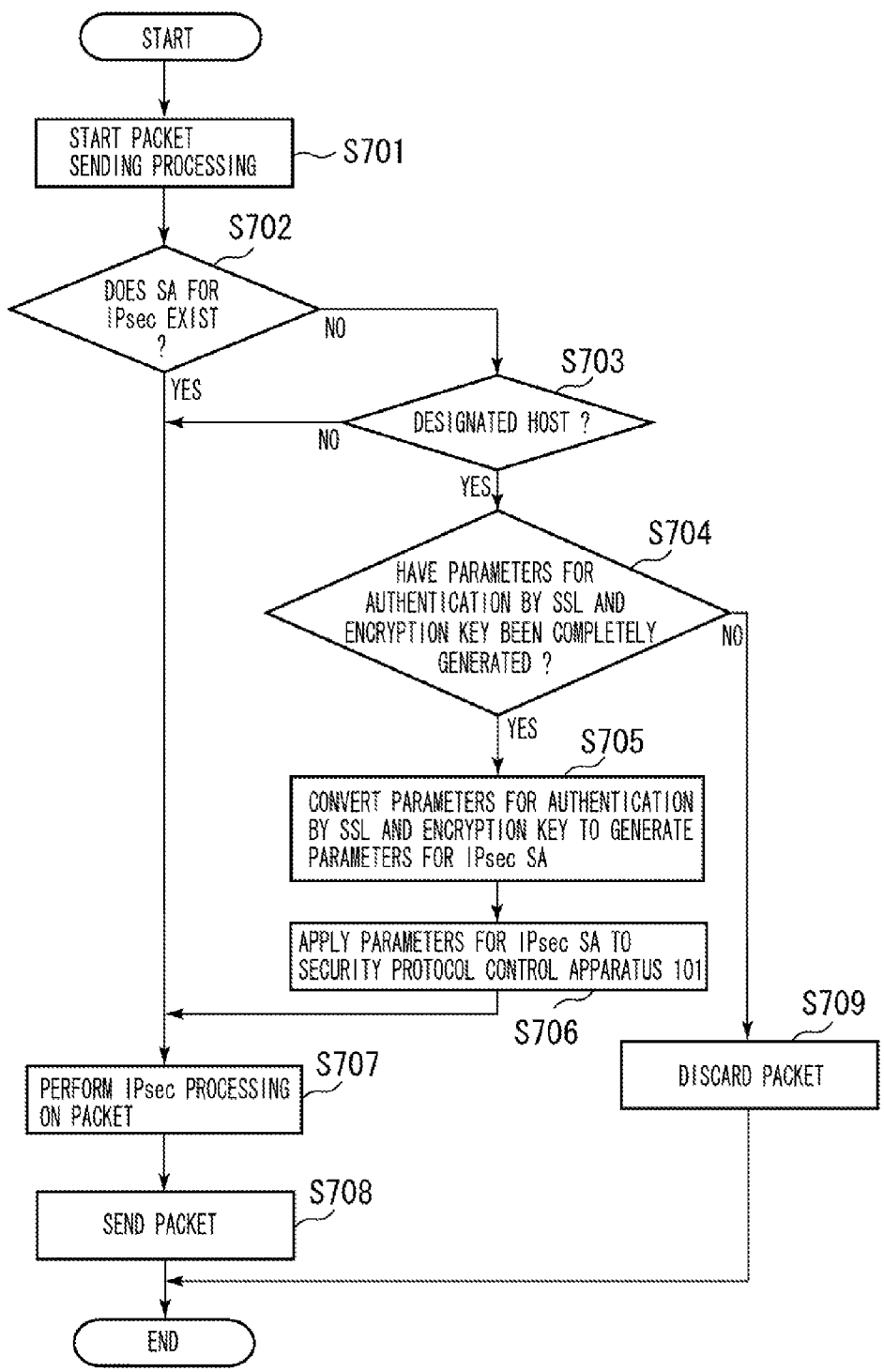
FIG. 7 is a flow chart illustrating an example of processing for sending a packet performed by a security protocol control apparatus according to an exemplary embodiment of the present invention.

FIG. 7 is a flow chart illustrating an example of processing for sending a packet performed by the security protocol control apparatus 1 101 according to the exemplary embodiment.

Referring to FIG. 7, in step S701, the security protocol control apparatus 1 101 starts packet sending processing. Then, the processing proceeds to step S702.

In step S702, the security protocol control apparatus 1 101 searches for an SA for the IPsec suitable to the sent packet from among the SAs for the IPsec held in the security protocol control apparatus 1 101 to determine whether an SA for the IPsec suitable to the sent packet from among the SAs for the IPsec exists.

If it is determined in step S702 that an SA for the IPsec suitable to the sent packet from among the SAs for the IPsec exists (YES in step S702), the processing advances to step S707. On the other hand, if it is determined in step S702 that no SA for the IPsec suitable to the sent packet from among the SAs for the IPsec exists (NO in step S702), the processing advances to step S703.

In step S703, the security protocol control apparatus 1 101 determines whether a destination of sending the packet is a host designated by the user according to an address of the destination of sending the packet, an address of a packet sending source apparatus, and a header option, which are written in a header of the packet.

If it is determined in step S703 that the packet sending destination is the designated host (YES in step S703), the processing advances to step S704. If it is determined in step S703 that the packet sending destination is not the designated host (NO in step S703), the processing advances to step S707.

In step S704, the security protocol control apparatus 1 101 determines whether parameters for the authentication processing and the encryption key according to the SSL have been completely generated between the security protocol control apparatus 1 101 and the security protocol control apparatus 2 102.

If it is determined in step S704 that the parameters for the authentication processing and the encryption key according to the SSL have been completely generated between the security protocol control apparatus 1 101 and the security protocol control apparatus 2 102 (YES in step S704), the processing advances to step S705.

If it is determined in step S704 that the parameters for the authentication processing and the encryption key according to the SSL have not been completely generated between the security protocol control apparatus 1 101 and the security protocol control apparatus 2 102 (NO in step S704), the processing advances to step S709.

In step S705, the security protocol control apparatus 1 101 converts the existing parameters for the authentication information and the encryption key according to the SSL, which have been defined between the security protocol control apparatus 1 101 and the security protocol control apparatus 2 102 into parameters for the SA for the IPsec to generate the parameters for SA for the IPsec. Then, the processing advances to step S706.

In step S706, the security protocol control apparatus 1 101 applies to the security protocol control apparatus 1 101 the newly generated parameters for the SA for the IPsec to be utilized between the security protocol control apparatus 1 101 and the security protocol control apparatus 2 102. Then, the processing advances to step S707.

In step S707, the security protocol control apparatus 1 101 performs IPsec processing on the packet according to the SA for the IPsec held by the security protocol control apparatus 1 101. Then, the processing advances to step S708.

In step S708, the security protocol control apparatus 1 101 sends the thus processed packet to the security protocol control apparatus 2 102. Then, the processing ends.

In step S709, the security protocol control apparatus 1 101 discards the packet. Then, the processing ends.

Figure 8:
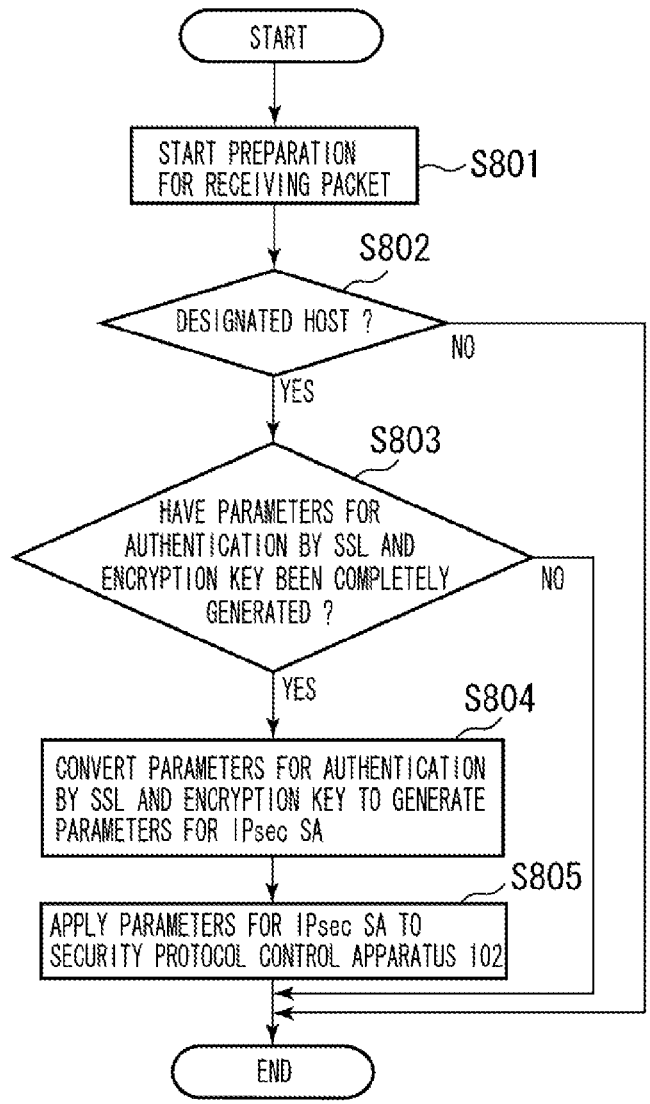
FIG. 8 is a flow chart illustrating an example of processing for preparing for receiving a packet performed by a security protocol control apparatus according to an exemplary embodiment of the present invention.

FIG. 8 is a flow chart illustrating an example of processing for preparing for receiving the packet performed by the security protocol control apparatus 2 102 according to the present embodiment. When the security protocol control apparatus 2 102 communicates with the security protocol control apparatus 1 101, it is necessary for the security protocol control apparatus 2 102 to prepare for receiving the packet sent from the security protocol control apparatus 1 101.

Referring to FIG. 8, in step S801, the security protocol control apparatus 2 102 starts processing for preparing for receiving a packet from the security protocol control apparatus 1 101. Then, the processing advances to step S802.

In step S802, the security protocol control apparatus 2 102 determines whether the designated host is appropriate for receiving the packet.

If it is determined in step S802 that the designated host is appropriate for receiving the packet (YES in step S802), then the processing advances to step S803. If it is determined in step S802 that the designated host is not appropriate for receiving the packet (NO in step S802), the processing ends.

In step S803, the security protocol control apparatus 2 102 determines whether the parameters for the authentication processing and the encryption key according to the SSL have been completely generated between the security protocol control apparatus 1 101 and the security protocol control apparatus 2 102.

If it is determined in step S803 that the parameters for the authentication processing and the encryption key according to the SSL have been completely generated between the security protocol control apparatus 1 101 and the security protocol control apparatus 2 102 (YES in step S803), the processing advances to step S804.

If it is determined in step S803 that the parameters for the authentication processing and the encryption key according to the SSL have not been completely generated between the security protocol control apparatus 1 101 and the security protocol control apparatus 2 102 (NO in step S803), the processing ends.

In step S804, the security protocol control apparatus 2 102 converts the existing parameters for the authentication information and the encryption key according to the SSL, which have been defined between the security protocol control apparatus 1 101 and the security protocol control apparatus 2 102 into parameters for the SA for the IPsec to generate the parameters for SA for the IPsec.

In step S805, the security protocol control apparatus 2 102 applies to the security protocol control apparatus 2 102 the newly generated parameters for the SA for the IPsec to be utilized between the security protocol control apparatus 1 101 and the security protocol control apparatus 2 102. Then, the processing ends.

Now, a method for converting the parameters for the SSL authentication information and the encryption key into parameters for the SA for the IPsec according to the present embodiment is described below with reference to FIG. 9.

Figure 9:
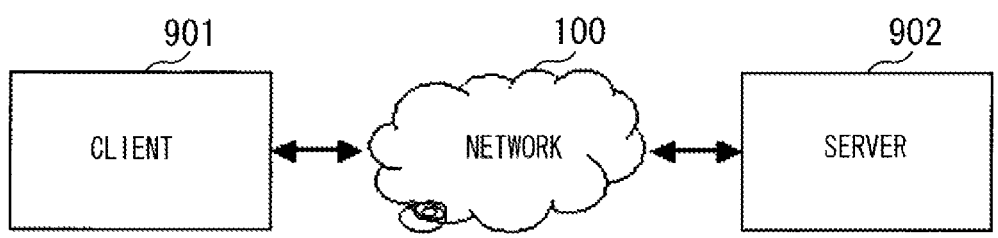
FIG. 9 illustrates an example of a network configuration according to an exemplary embodiment of the present invention.

Referring to FIG. 9, the security protocol control apparatus 1 101 serves as a client 901 operating in the processing according to the SSL, and the security protocol control apparatus 2 102 serves as a server 902 operating in the processing according to the SSL.

In the example illustrated in FIG. 9, a session and a connection between the client 901 and the server 902 according to the SSL have been already established. Accordingly, in this state, the client 901 can acquire a session identification (ID), a master secret, and an IP address of each of the client 901 and the server 902.

The client 901 defines a predetermined number of high-order bits of a value generated by using a hash function using the acquired session ID as an argument as a Security Parameters Index (SPI) required as a parameter for the SA for the IPsec.

In addition, the client 901 defines a predetermined number of high-order bits of a value generated by using a hash function using the acquired master secret as an argument as each of an encryption key and a hash key.

As described above, the client 901 can acquire the IP address of the client 901 and the IP address of the server 902 based on the information about the session and the connection according to the SSL. Accordingly, the IP address of the client 901 and the IP address of the server 902 are utilized as the parameters for the SA for the IPsec.

The information conversion unit 403 of the client 901 holds default parameter information. With the default parameter information, the information conversion unit 403 complements a mode of the IPsec, an encryption algorithm, and a hash algorithm, which are lacking with respect to the parameters for the SA for the IPsec.

Thus, the client 901 can generate integrated parameters for the SA for the IPsec by converting the parameters for the authentication information and the encryption key according to the SSL.

In addition, since the session and the connection between the client 901 and the server 902 according to the SSL have been already established as described above, in this state, the server 902 can acquire the session ID, the master secret, and the IP address of each of the client 901 and the server 902.

The server 902 defines a predetermined number of high-order bits of a value generated by using a hash function using the acquired session ID as an argument as the SPI required as a parameter for the SA for the IPsec.

In addition, the server 902 defines a predetermined number of high-order bits of a value generated by using a hash function using the acquired master secret as an argument as each of an encryption key and a hash key.

The server 902 can acquire the IP address of the client 901 and the IP address of the server 902 based on the information about the session and the connection according to the SSL. Accordingly, the IP address of the client 901 and the IP address of the server 902 are utilized as the parameters for the SA for the IPsec.

The information conversion unit 503 of the server 902 holds default parameter information. With the default parameter information, the information conversion unit 503 complements a mode of the IPsec, an encryption algorithm, and a hash algorithm, which are lacking with respect to the parameters for the SA for the IPsec.

Thus, the server 902 can generate integrated parameters for the SA for the IPsec by converting the parameters for the authentication information and the encryption key according to the SSL.

With the above-described method, both the client 901 and the server 902 can hold the integrated parameters for the SA for the IPsec and, thereafter, can communicate with each other according to the IPsec.

In the above-described embodiment, the parameters for the authentication information and the encryption key according to the SSL are converted into the parameters for the SA for the IPsec to generate the parameters for the SA for the IPsec. However, the present embodiment is not limited to this. That is, alternatively, a part of a value generated and obtained based on the master secret can be utilized as a parameter to be defined as the SPI.

In addition, the information conversion unit 403 or 503 can hold default parameter information, such as a flag or an algorithm, other than those described above.

Furthermore, unique information, such as a user name and a password that the user registers, information unique to the security protocol, and biometric information about the user, can be used as the parameters for the security protocol.

Each of the units constituting the security protocol control apparatus and each of the steps in the security protocol control method according to the above-described exemplary embodiment can be implemented by operating a program stored on a RAM or a ROM of a computer. The program and a computer-readable recording medium (storage medium) storing the program can be included in the scope of the present invention.

Moreover, the present invention can be applied to a system, an apparatus, a method, a program, or a recording medium (storage medium) storing the program. More specifically, the present invention can be applied to a system including a plurality of devices (e.g., a computer, an interface device, a reader, a printer, a file server) and to an apparatus that includes one device (e.g., a network multifunction peripheral).

The present invention can be implemented by directly or remotely supplying a software program implementing functions of the above-described exemplary embodiments (in the exemplary embodiments, the program corresponding to the processing performed according to the flow chart of FIGS. 7 and 8), to a system or an apparatus and reading and executing the supplied program code with a computer of the system or the apparatus.

Accordingly, the program code itself, which is installed on the computer for implementing the functional processing of the present invention with the computer, implements the present invention. That is, the present invention also includes the computer program implementing the functional processing of the present invention.

The program can be configured in any form, such as object code, a program executed by an interpreter, and script data supplied to an operating system (OS).

As the recording medium for supplying such program code, a floppy disk, a hard disk, an optical disk, a magneto-optical disc (MO), a compact disc-read only memory (CD-ROM), a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk. The functions of the above-described embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Furthermore, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-281885 filed Oct. 16, 2006, which is hereby incorporated by reference herein in its entirety.

What is claimed is:

1. A security protocol control apparatus, comprising:
   a transmission unit configured to transmit a packet to a communication partner;
   an establishment determination unit configured to determine whether a communication according to a Secure Socket Layer (SSL) has been established;
   a communication establishment unit configured to establish a communication according to the SSL;
   a generation determination unit configured to determine whether to generate a second parameter for an IP Security Protocol (IPsec) according to a first parameter for the SSL and control information for the security protocol control apparatus;
   a generation unit configured to generate, within the security protocol control apparatus and based on the first parameter generated for the SSL previously established with the communication partner, the second parameter for the IPsec that has not yet been established;
   a processing unit configured to generate a security association based on the second parameter for the IPsec, and perform an IPsec processing according to the security association on the packet to be transmitted by the transmission unit; and
   a discard unit configured to discard the packet without the processing unit performing IPsec processing on the packet according to a security association when the first parameter for the SSL has not yet been generated.

2. The security protocol control apparatus according to claim 1, further comprising:
   a complement unit configured to complement setting information for the IPsec with information entered by a user and information generated based on biometric information about the user.

3. The security protocol control apparatus according to claim 1, further comprising:
   an applying unit configured to apply the second parameter for a security association for the IPsec, wherein the processing unit further is configured to utilize the security association for the IPsec to perform the IPsec process on the packet to be transmitted by the transmission unit.

4. The security protocol control apparatus according to claim 3, further comprising:
   a converting unit configured to dynamically convert information about parameters for an authentication processing according to the SSL and an encryption key into the security association for the IPsec, wherein the applying unit applies the converted security association for the IPsec to the security protocol control apparatus.

5. A method for a security protocol control apparatus, the method comprising:
   transmitting a packet to a communication partner;
   determining whether a communication according to a Secure Socket Layer (SSL) has been established;
   establishing a communication according to the SSL;
   determining whether to generate a second parameter for an IP Security Protocol (IPsec) according to a first parameter for the SSL and control information for the security protocol control apparatus;
   generating within the security protocol control apparatus and based on the first parameter generated for the SSL previously established with the communication partner, the second parameter for the IPsec that has not yet been established;
   generating a security association based on the second parameter for the IPsec;
   performing an IPsec processing according to the security association on the packet to be transmitted; and
   discarding the packet without performing IPsec processing on the packet according to a security association when the first parameter for the SSL has not yet been generated.

6. The method according to claim 5, further comprising:
complementing setting information for the IPsec with information entered by a user and information generated based on biometric information about the user.

7. The method according to claim 5, further comprising:
applying the second parameter for a security association for the IPsec, wherein performing further includes utilizing the security association for the IPsec to perform the IPsec process on the packet to be transmitted.

8. The method according to claim 7, further comprising:
dynamically converting information about parameters for an authentication processing according to the SSL and an encryption key into the security association for the IPsec, wherein applying includes applying the converted security association for the IPsec to the security protocol control apparatus.

9. A non-transient computer-readable storage medium storing instructions which, when executed by a computer, cause the computer to perform a method to transmit a packet to a communication partner, the method comprising:
determining whether a communication according to a Secure Socket Layer (SSL) has been established;
establishing a communication according to the SSL;
determining whether to generate a second parameter for an IP Security Protocol (IPsec) according to a first parameter for the SSL and control information for the computer to perform the method to transmit the packet to the communication partner;
generating within the computer and based on the first parameter generated for the SSL previously established with the communication partner, the second parameter for the IPsec that has not yet been established;
generating a security association based on the second parameter for the IPsec;
performing an IPsec processing according to the security association on the packet to be transmitted; and
discarding the packet without performing IPsec processing on the packet according to a security association when the first parameter for the SSL has not yet been generated.

10. A security protocol control apparatus to transmit a packet to a communication partner, the security protocol control apparatus comprising:
a processing unit configured to perform processing utilizing a Secure Socket Layer (SSL) cryptographic protocol and to perform processing utilizing an IP Security Protocol (IPsec);
a generation unit configured to generate an IPsec parameter;
a determining unit configured to determine whether SSL parameters for the SSL cryptographic protocol have been generated between the security protocol control apparatus and the communication partner; and
a discard unit configured to discard the packet,
wherein, when the determining unit determines that SSL parameters for the SSL cryptographic protocol have been generated between the security protocol control apparatus and the communication partner,
the generation unit converts at least one SSL parameter into at least one IPsec parameter, and
the processing unit utilizes the at least one IPsec parameter to establish an IPsec communication between the security protocol control apparatus and the communication partner, converts information about the at least one IPsec parameter into a security association, and performs IPsec processing on the packet according to the security association to form a processed packet, and wherein, when the determining unit determines that SSL parameters for the SSL cryptographic protocol have not been generated between the security protocol control apparatus and the communication partner, the discard unit discards the packet without the processing unit performing IPsec processing on the packet according to a security association.

11. The security protocol control apparatus according to claim 10, wherein the determining unit determines that SSL parameters for the SSL cryptographic protocol have been completely generated between the security protocol control apparatus and the communication partner if a SSL communication has been established between the security protocol control apparatus and the communication partner.

12. The security protocol control apparatus according to claim 10, wherein the determining unit determines that SSL parameters for the SSL cryptographic protocol have been completely generated if a SSL parameter for a SSL cryptographic protocol has been generated.

13. The security protocol control apparatus according to claim 10, further comprising:
a sending unit configured to send the processed packet to the communication partner.

14. The security protocol control apparatus according to claim 10, further comprising:
a storage unit holding a plurality of security associations for the IPsec, wherein the determining unit further is configured to determine whether an IPsec security association for the IPsec suitable to the packet exists from among the plurality of security associations for the IPsec held in the storage unit, and, if the determining unit determines that an IPsec security association for the IPsec suitable to the packet exists, then the processing unit performs IPsec processing on the packet according to the IPsec security association for the IPsec determined to exist.

15. The security protocol control apparatus according to claim 10, wherein the determining unit further is configured to determine whether the communication partner is a designated host designated by a user according to an address of a destination of sending the packet, an address of a packet sending source apparatus, and a header option, which are written in a header of the packet, and, if the determining unit determines that the communication partner is a designated host, then the determining unit determines whether parameters for the cryptographic protocol have been completely generated between the security protocol control apparatus and the communication partner.

16. The security protocol control apparatus according to claim 10, wherein the processing unit includes an SSL processing unit configured to perform processing utilizing a SSL cryptographic protocol and an IPsec processing unit configured to perform processing utilizing an IPsec, the security protocol control apparatus further comprising:
an SSL changing unit configured to refer to, extract, and insert parameters required to utilize the SSL cryptographic protocol, and refer to security information for and manages a state of the SSL cryptographic protocol;
an IPsec changing unit configured to refer to, extract, and insert parameters required to utilize the IPsec, and refer to security information for and manage a state of the IPsec; and
an information conversion unit connected between the SSL changing unit and the IPsec changing unit and configured to acquire parameters and status information and convert the acquired information into at least one of abstracted information and protocol-dependent information, including parameters for the SSL cryptographic protocol and the IPsec.

17. The security protocol control apparatus according to claim 10, wherein the security protocol control apparatus is configured to communicate with the communication partner over the Internet utilizing a communication protocol for a network layer, wherein the communication protocol for the network layer is at least one of IPv4 communication protocol and IPv6 communication protocol.

18. A method for a security protocol control apparatus to transmit a packet to a communication partner, the method comprising:
- determining whether Secure Socket Layer (SSL) parameters for a SSL cryptographic protocol have been generated between the security protocol control apparatus and the communication partner;
- wherein, when it is determined that SSL parameters for the SSL cryptographic protocol have been generated between the security protocol control apparatus and the communication partner,
- generating at least one IPsec parameter from at least one SSL parameter,
- utilizing the at least one IPsec parameter to establish an IPsec communication between the security protocol control apparatus and the communication partner,
- converting information about the at least one IPsec parameter into a security association, and
- performing IPsec processing on the packet according to the security association to form a processed packet; and
- when it is determined that SSL parameters for the SSL cryptographic protocol have not been generated between the security protocol control apparatus and the communication partner, discarding the packet without performing IPsec processing on the packet according to a security association.

19. The method according to claim 18, further comprising: sending the processed packet to the communication partner.

20. A non-transient computer-readable storage medium storing a program to cause a security protocol control apparatus to perform a method to transmit a packet to a communication partner, the method comprising:
- determining whether Secure Socket Layer (SSL) parameters for a SSL cryptographic protocol have been generated between the security protocol control apparatus and the communication partner; and
- discarding the packet without performing IPsec processing on the packet according to a security association when it is determined that SSL parameters for the SSL cryptographic protocol have not been generated between the security protocol control apparatus and the communication partner,
- wherein, when it is determined that SSL parameters for the SSL cryptographic protocol have been generated between the security protocol control apparatus and the communication partner,
- generating at least one IPsec parameter from at least one SSL parameter,
- utilizing the at least one IPsec parameter to establish an IPsec communication between the security protocol control apparatus and the communication partner,
- converting information about the at least one IPsec parameter into a security association, and
- performing IPsec processing on the packet according to the security association to form a processed packet.

\* \* \* \* \*